United States Patent
Choi

(10) Patent No.: US 12,141,639 B2
(45) Date of Patent: Nov. 12, 2024

(54) POWER SOURCE-LESS SENSOR DEVICE

(71) Applicant: AMOSENSE CO., LTD, Cheonan-si (KR)

(72) Inventor: Joong Hyun Choi, Cheonan-si (KR)

(73) Assignee: AMOSENSE CO., LTD, Cheonan-si (KR)

(*) Notice: Subject to any disclaimer, the term of this patent is extended or adjusted under 35 U.S.C. 154(b) by 0 days.

(21) Appl. No.: 18/043,153

(22) PCT Filed: Sep. 1, 2021

(86) PCT No.: PCT/KR2021/011758
§ 371 (c)(1),
(2) Date: Feb. 27, 2023

(87) PCT Pub. No.: WO2022/050683
PCT Pub. Date: Mar. 10, 2022

(65) Prior Publication Data
US 2023/0316010 A1    Oct. 5, 2023

(30) Foreign Application Priority Data
Sep. 4, 2020   (KR) .................. 10-2020-0112777

(51) Int. Cl.
*G06K 7/00* (2006.01)
*H02J 50/10* (2016.01)

(52) U.S. Cl.
CPC ............ *G06K 7/0008* (2013.01); *H02J 50/10* (2016.02)

(58) Field of Classification Search
CPC ............................ G06K 7/0008; H02J 50/10
USPC ......................................................... 235/439
See application file for complete search history.

(56) References Cited

FOREIGN PATENT DOCUMENTS

| | | |
|---|---|---|
| JP | 2016-97075 A | 5/2016 |
| KR | 10-2014-0092051 A | 7/2014 |
| KR | 10-2016-0078232 A | 7/2016 |
| KR | 10-2020-0056466 A | 5/2020 |
| KR | 10-2020-0088254 A | 7/2020 |
| WO | 2006/101614 A1 | 9/2006 |

OTHER PUBLICATIONS

Office Action for KR 10-2020-0112777 by Korean Intellectual Property Office dated Jun. 19, 2023.
International Search Report for PCT/KR2021/011758 by Korean Intellectual Property Office dated Dec. 14, 2021.

*Primary Examiner* — Daniel A Hess
(74) *Attorney, Agent, or Firm* — BROADVIEW IP LAW, PC

(57) ABSTRACT

Provided is a power source-less sensor device. A power source-less sensor device according to an exemplary embodiment of the present invention comprises: a sensor module which includes a sensing unit including at least one sensor and includes a communication unit for transmitting, to the outside, information sensed from the sensing unit; a capacitor for providing driving power to the sensor module; and an NFC antenna module for generating an induced current so as to charge the capacitor during NFC tagging. The sensor module is periodically driven by using power charged in the capacitor.

6 Claims, 2 Drawing Sheets

POWER SOURCE-LESS SENSOR DEVICE

CROSS-REFERENCE TO RELATED APPLICATIONS

This application is a National Phase Entry Application of PCT Application No. PCT/KR2021/011758 filed on Sep. 1, 2021, which claims priority to Korean Patent Application No. 10-2020-0112777 filed on Sep. 4, 2020, in Korean Intellectual Property Office, the entire contents of which are hereby incorporated by reference in its entirety.

TECHNICAL FIELD

The present invention relates to a power source-less sensor device.

BACKGROUND ART

Sensor devices are generally very small in physical size, and are attached to articles such as home appliances as well as home delivery products or the body to measure various information such as a state of an object, information related to a surrounding environment or a surrounding environment, and a biometric signal.

Information measured by these sensor devices is transmitted to the outside through a communication module such as an NFC module or a Bluetooth module.

Accordingly, a sensor for sensing various information and a battery for driving a communication module for transmitting information measured by the sensor to the outside are built into the sensor device.

However, since the sensor device with a built-in battery uses the power of the built-in battery as a driving power, there is a problem in that it cannot operate when the built-in battery is completely discharged.

Accordingly, in order to use a sensor device with a built-in battery for a long time, a high-capacity battery must be built-in, or the battery roust be periodically replaced.

However, if a high-capacity battery is embedded in the sensor device in order to increase the use time, there is a problem in that the overall size of the sensor device increases and the production cost increases. In addition, a sensor device in which battery replacement is difficult or impossible cannot be reused when the power of the built-in battery is completely discharged, so there is a problem that they can only be used once.

DISCLOSURE

Technical Problem

The present invention has been made in view of the above problems, and the present invention is directed to providing a power source-less sensor device capable of detecting various information and then transmitting the detected information to the outside even if a battery is not used.

Technical Solution

One aspect of the present invention provides a power source-less sensor device, comprising: a sensor module which includes a sensing unit including at least one sensor and includes a communication unit configured to transmit information detected by the sensing unit to the outside; a capacitor for providing driving power to the sensor module; and an NFC antenna module for generating an induced current to store electricity in the capacitor during NFC tagging; wherein the sensor module is periodically driven by using power stored in the capacitor.

In addition, the communication unit may be a Bluetooth module.

In addition, the sensor module may advertise information detected by the sensing unit through the communication unit or transmit the information to a paired external device in a predetermined time unit.

In addition, the sensor module may further include a memory unit configured to store information detected by the sensing unit.

In addition, the information stored in the memory unit may be transmitted to a NFC reader through the NFC antenna module during NFC tagging.

In addition, the sensing unit may include one or more sensors selected from a temperature sensor, a humidity sensor, an illuminance sensor, a pressure sensor, and an acceleration sensor.

In addition, the power source-less sensor device may be implemented as a patch type attached to a detection object.

In addition, a battery may be not built into the power source-less sensor device.

Advantageous Effects

According to the present invention, the sensor module may be driven without using a battery, and thus, the sensor module may be semi-permanently used. Accordingly, it is possible to secure data continuously and stably.

MODES OF THE INVENTION

Figure 1:
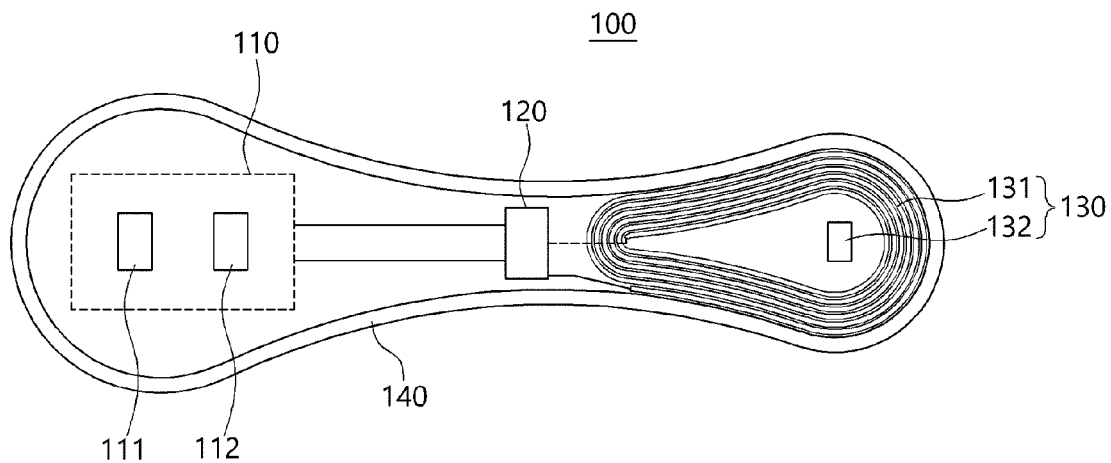
FIG. 1 is a view illustrating a power source-less sensor device according to one embodiment of the present invention.

Hereinafter, embodiments of the present invention will be described in detail with reference to the accompanying drawings which may allow one of ordinary skill in the art to easily carry out the present invention. The present invention may be implemented in various forms and is not limited to the following embodiments. Parts not related to the description are not included in the drawings to clearly describe the present invention, and the same reference symbols are used for the same or similar components in the description.

As shown in FIG. 1, the power source-less sensor device 100 according to one embodiment of the present invention includes a sensor module 110, a capacitor 120, and an antenna module 130.

The sensor module 110 may measure various information such as a state of an object, information related to a surrounding environment or a surrounding environment, or a biometric signal such as a body temperature, and then may transmit the measured information to the outside.

To this end, the sensor module 110 may include a sensing unit 111 including at least one sensor and a communication unit 112 configured to transmit information detected by the sensing unit 111 to the outside.

Herein, various known sensors may be applied to the sensor constituting the sensing unit 111 depending on information to be detected.

For example, the sensing unit 111 may include at least one of a temperature sensor, a humidity sensor, an illuminance sensor, a pressure sensor, and an acceleration sensor. However, the type of the sensor constituting the sensing unit 111 is not limited thereto, and various known sensors may be used depending on the desired measurement information.

Figure 3:
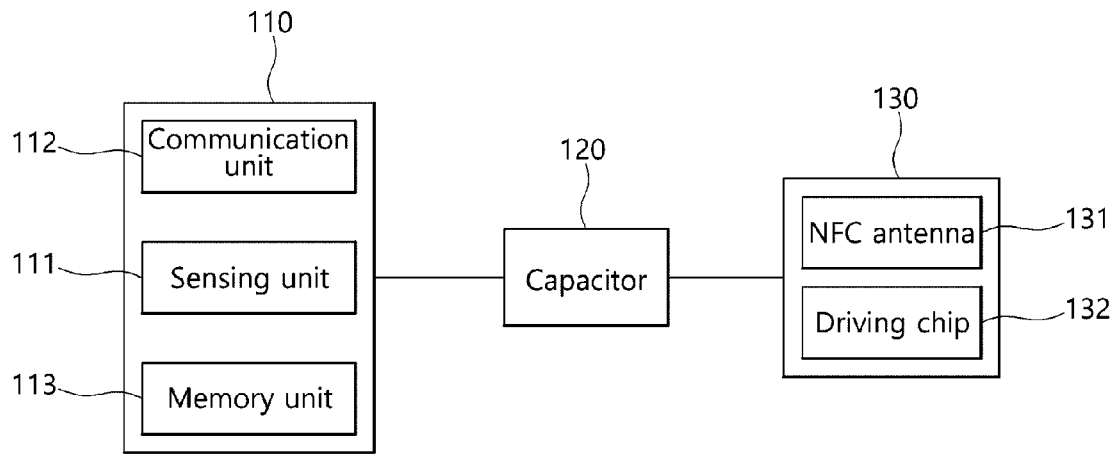
FIG. 3 is a block diagram illustrating a main configuration of a power source-less sensor device according to one embodiment of the present invention.

In the present invention, as shown in FIG. 3, the sensor module 110 may further include a memory unit 113 capable of temporarily storing information measured by the sensing unit 111, and the memory unit 113 may be integrally provided with a control unit (not shown) for controlling the overall operation of the sensor module 110.

In addition, the communication unit 112 may transmit information detected by the sensing unit 111 to the outside as described above. That is, the communication unit 112 may transmit information stored in the memory unit 113 to the outside.

In this case, the communication unit 112 may be configured to stably transmit while using low power upon driving. For example, the communication unit 112 may be a Bluetooth Low Energy (BLE) module. Such a case, the Bluetooth Low Energy module may transmit information detected by the sensing unit 111 to the outside through a one-way or two-way communication method.

Figure 4:
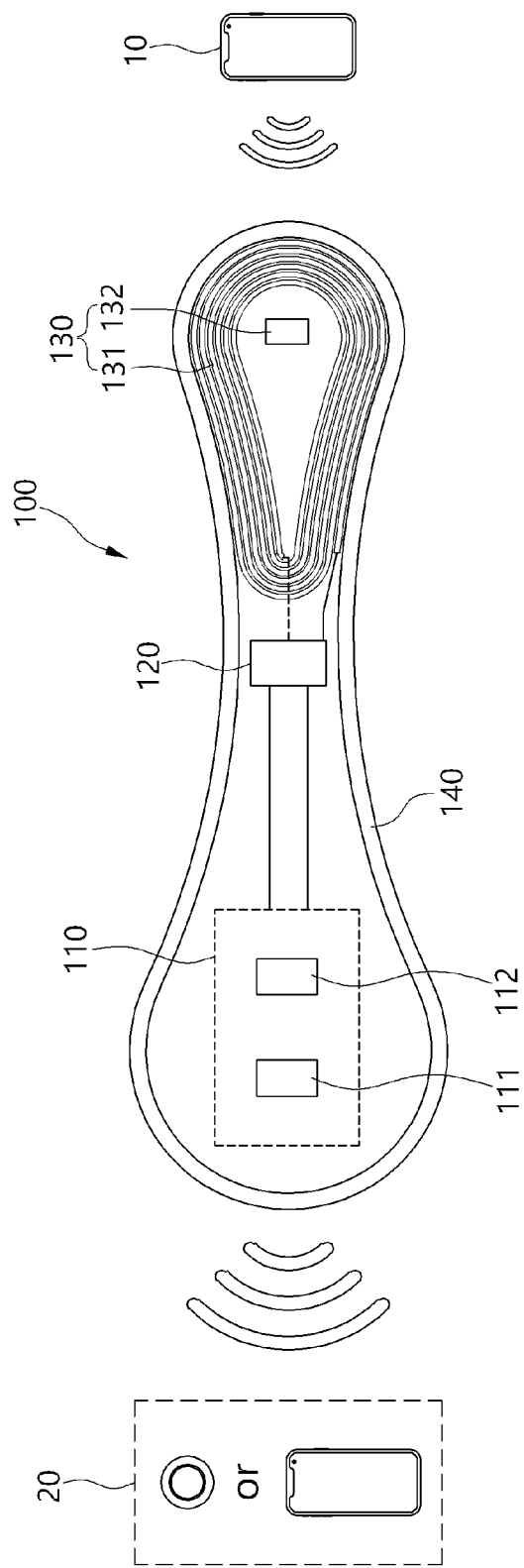
FIG. 4 is a use state diagram of a power source-less sensor device according to one embodiment of the present invention.

That is, as shown in FIG. 4, the Bluetooth Low Energy module may transmit information to the external electronic device in a state of being paired with a user terminal such as a smartphone or an external electronic device 20 such as a beacon gateway, or may advertise to the external electronic device 20 without separate pairing.

Accordingly, the power source-less sensor device 100 according to one embodiment of the present invention may advertise information detected by a predetermined time unit through the sensing unit 111 to the external electronic device 20 through the communication unit 112, or may transmit the information to the paired external electronic device 20.

For example, when the Bluetooth Low Energy module advertises information detected through the sensing unit 111 to an external electronic device 20 such as a beacon gateway installed in a predetermined place, the information transmitted to the beacon gateway through the communication unit 112 may be transmitted to a separate server along with location information of a place where the beacon gateway is installed. Herein, the location information may be location information fixed for each floor and/or each space for a place where the beacon gateway is installed.

As another example, when the Bluetooth Low Energy module transmits information detected through the sensing unit 111 to the paired external electronic device 20, the user may identify the information transmitted through the paired external electronic device 20, thereby enabling stable data transmission without deterioration of the recognition rate.

The sensor module 110 may be mounted on at least one surface of a circuit board 140.

In this case, the power source-less sensor device 100 according to one embodiment of the present invention may provide driving power to the sensor module 110 using an energy harvesting method without using a primary battery or a secondary battery, such as a dry battery or a battery.

Through this, the power source-less sensor device 100 according to one embodiment of the present invention does not need to use a primary battery or a secondary battery, such as a dry battery or a battery, and thus may supply power to the sensor module 110 while reducing the overall size, thereby enabling stable data acquisition and continuous data transmission.

To this end, the power source-less sensor device 100 according to one embodiment of the present invention may include a capacitor 120 for providing driving power to the sensor module 110 and an NFC antenna module 130 for generating an induced current to store electricity in the capacitor 120.

Figure 2:
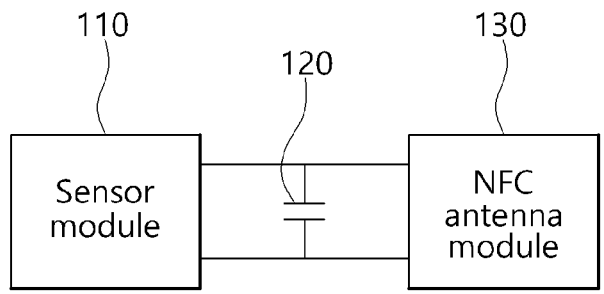
FIG. 2 is a circuit diagram of a power source-less sensor device according to one embodiment of the present invention.

That is, as shown in FIG. 2, the power source-less sensor device 100 according to one embodiment of the present invention may include a capacitor 120 electrically connected in parallel between the sensor module 110 and the NFC antenna module 130, and the capacitor 120 may store electricity using the induced current generated from the NFC antenna module 130 through the energy harvesting method.

Specifically, the capacitor 120 may store electricity through the induced current generated from the NFC antenna module 130 during NFC tagging, and the capacitor 120 may be a super capacitor to have a storage capacity of a high capacity.

Through this, the sensor module 110 may be periodically driven using the power stored in the capacitor 120. That is, the sensing unit 111 may periodically detect at least one information using the power provided from the capacitor 120, and the communication unit 112 may transmit the information obtained from the sensing unit 111 to the outside.

Accordingly, as described above, the power source-less sensor device 100 according to one embodiment of the present invention may be stably driven using the power stored in the capacitor 120 without using a primary battery or a secondary battery, such as a dry battery or a battery, and thus may continuously obtain data and then transmit the data to the outside, and the capacitor 120 may be restored repeatedly through NFC tagging.

Accordingly, as shown in FIG. 4, the power source-less sensor device 100 according to one embodiment of the present invention may be semi-permanently used and reused because the power source-less sensor device 100 may be restored through NFC tagging using a terminal 10 in which an NFC reader or an NFC antenna module is embedded during discharging of the capacitor 120. In addition, the power source-less sensor device 100 according to one embodiment of the present invention does not need to use a primary battery or a secondary battery, such as a dry battery or a battery, while stably transmitting data to an external electronic device using a Bluetooth module, thereby reducing the overall size and reducing the production cost.

Herein, as shown in FIG. 1, the NFC antenna module 130 may include an NFC antenna 131 patterned on at least one surface of the circuit board 140 and a driving chip 132 for driving the NFC antenna 131, both ends of the NFC antenna 131 may be electrically connected to the sensor module 110, and the capacitor 120 may be connected in parallel with the sensor module 110 and the NFC antenna module 130, respectively, as described above.

In this case, the NFC antenna module 130 may perform a data communication function of receiving information obtained through the sensing unit 111 while storing electricity in the capacitor 120 during NFC tagging.

That is, the NFC antenna module 130 may transmit information stored in the memory unit 113 to a terminal such as an NFC reader or a smartphone during NFC tagging.

Accordingly, the user may receive information stored in the memory unit 113 through the NFC reader or the smartphone and may collectively check the information.

As described above, in the power source-less sensor device 100 according to one embodiment of the present invention, since the capacitor 120 may store electricity using the energy harvesting method through NFC tagging, the sensor module 110 may use the power stored in the capacitor 120 as a driving power.

Accordingly, even if the sensor module 110 includes a communication unit 112 such as Bluetooth, which requires greater power consumption compared to the sensing unit 111, the communication unit 112 may secure a stable driving power, and thus may acquire and transmit data continuously and stably.

Accordingly, the power source-less sensor device 100 according to one embodiment of the present invention may employ a data transmission scheme using a Bluetooth module as the communication unit 112, thereby improving a problem of deterioration of a recognition rate that occurred when data is transmitted through NFC tagging, and may share data through Bluetooth communication, and thus may be implemented as various products that require continuous monitoring.

For example, the power source-less sensor device 100 according to one embodiment of the present invention may be implemented as a patch type in which one surface is attached to a detection object such as an article or a human body, and may be utilized as a data logger capable of continuously monitoring the article, an environment around the article, and a biometric signal such as a body temperature, and the like while being attached to the detection object.

In this case, the power source-less sensor device 100 may be provided with an adhesive layer (not shown) having an adhesive force or an adhesive force at a portion attached to the detection object to be attached to the detection object, and may be prevented from being exposed to the outside through a protective member for protecting from an external environment.

Although one embodiment of the present invention has been described above, the spirit of the present invention is not limited to the embodiment shown in the present specification, and although those skilled in the art may propose other embodiments through the addition, change, or removal of components within the scope of the same spirit of the present invention, such embodiments are also included in the scope of the present invention.

The invention claimed is:

1. A power source-less sensor device, comprising:
   a sensor module which includes a sensing unit including at least one sensor and includes a communication unit configured to transmit information detected by the sensing unit to the outside;
   a capacitor for periodically providing driving power to the sensor module so that the sensor module can be periodically driven; and
   an NFC antenna module for generating an induced current to store electricity in the capacitor during NFC tagging,
   wherein the sensor module includes a memory unit configured to store information detected by the sensing unit,
   wherein the capacitor is electrically connected in parallel between the sensor module and the NFC antenna module,
   wherein the capacitor stores electricity using the induced current generated from the NFC antenna module through an energy harvesting method during NFC tagging,
   wherein the sensing unit periodically senses information using power provided from the capacitor, and
   wherein the information stored in the memory unit is transmitted to an NFC reader through the NFC antenna module during NFC tagging.

2. The power source-less sensor device of claim 1, wherein the communication unit is a Bluetooth module.

3. The power source-less sensor device of claim 2, wherein the sensor module advertises information detected by the sensing unit through the communication unit transmits the information paired external device in a predetermined time unit.

4. The power source-less sensor device of claim 1, wherein the sensing unit comprises one or more sensors selected from a temperature sensor, a humidity sensor, an illuminance sensor, a pressure sensor, and an acceleration sensor.

5. The power source-less sensor device of claim 1, wherein the power source-less sensor device is implemented as a patch type attached to a detection object.

6. The power source-less sensor device of claim 1, wherein a battery is not built into the power source-less sensor device.

* * * * *